US011460125B2

(12) United States Patent
Eschenmoser et al.

(10) Patent No.: US 11,460,125 B2
(45) Date of Patent: Oct. 4, 2022

(54) VACUUM VALVE WITH ACOUSTIC SENSOR

(71) Applicant: VAT HOLDING AG, Haag (CH)

(72) Inventors: Adrian Eschenmoser, Grabs (CH);
Andre Gahler, Gams (CH); Michael Zickar, Englburg (CH)

(73) Assignee: VAT HOLDING AG, Haag (CH)

( * ) Notice: Subject to any disclaimer, the term of this patent is extended or adjusted under 35 U.S.C. 154(b) by 30 days.

(21) Appl. No.: 16/627,236

(22) PCT Filed: Jun. 28, 2018

(86) PCT No.: PCT/EP2018/067463
§ 371 (c)(1),
(2) Date: Dec. 27, 2019

(87) PCT Pub. No.: WO2019/002488
PCT Pub. Date: Jan. 3, 2019

(65) Prior Publication Data
US 2020/0132222 A1    Apr. 30, 2020

(30) Foreign Application Priority Data
Jun. 30, 2017 (EP) .................................... 17179101

(51) Int. Cl.
*F16K 51/02* (2006.01)
*F16K 37/00* (2006.01)
*F16K 3/18* (2006.01)
*F16K 3/06* (2006.01)
*F16K 3/10* (2006.01)

(52) U.S. Cl.
CPC ................ *F16K 51/02* (2013.01); *F16K 3/18* (2013.01); *F16K 3/06* (2013.01); *F16K 3/10* (2013.01); *F16K 37/0041* (2013.01); *F16K 37/0083* (2013.01)

(58) Field of Classification Search
CPC ... F16K 51/02; F16K 3/18; F16K 3/06; F16K 3/10; F16K 37/0041; F16K 37/0083; F16K 3/0218; F16K 3/04
See application file for complete search history.

(56) References Cited

U.S. PATENT DOCUMENTS 3,145,969 A    8/1964  Von Zweck Tiemo
4,833,453 A *  5/1989  Twerdochlib .......... G01V 1/001
                                                340/540

(Continued)

FOREIGN PATENT DOCUMENTS

CN    101255882 A    9/2008
CN    204025878 U   12/2014

(Continued)

OTHER PUBLICATIONS

International Search Report and Written Opinion dated Jun. 28, 2018 in International Application No. PCT/EP2018/067463.

*Primary Examiner* — Marina A Tietjen
(74) *Attorney, Agent, or Firm* — Muncy, Geissler, Olds & Lowe, P.C.

(57) ABSTRACT

Disclosed is a vacuum valve having at least one acoustic sensor, the acoustic sensor being designed such that information can be generated by the acoustic sensor via a structure-borne sound wave, as a measuring signal, impacting on at least one component of the vacuum valve.

13 Claims, 4 Drawing Sheets

(56) References Cited

U.S. PATENT DOCUMENTS

Figure 1A:
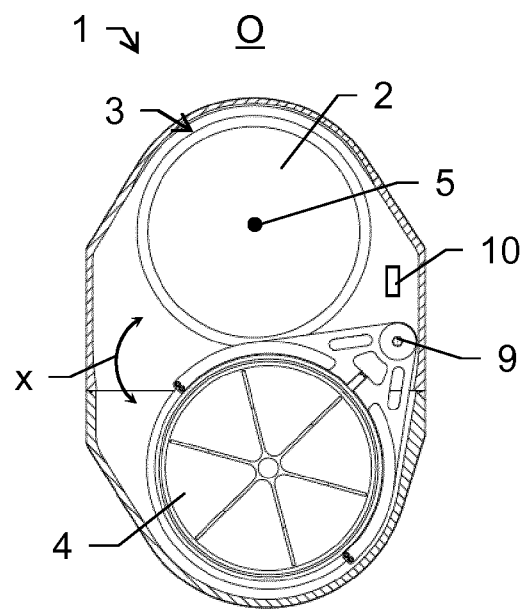

| | | |
|---|---|---|
| 5,577,707 A | 11/1996 | Brida |
| 6,056,266 A | 5/2000 | Blecha |
| 6,089,537 A | 7/2000 | Olmsted |
| 6,416,037 B1 | 7/2002 | Geiser |
| 6,629,682 B2 | 10/2003 | Duelli |
| 7,004,453 B1 * | 2/2006 | Cheng ................. F16K 3/06 251/167 |
| 9,528,901 B2 * | 12/2016 | Kiesbauer ............ G01M 3/02 |
| 2005/0067603 A1 | 3/2005 | Lucas et al. |
| 2008/0121290 A1 | 5/2008 | Pape et al. |
| 2009/0057597 A1 * | 3/2009 | Ji ........................ F16K 51/02 251/328 |
| 2014/0260624 A1 * | 9/2014 | Subrahmanyam ........................ H01L 21/67253 73/587 |

FOREIGN PATENT DOCUMENTS

| | | |
|---|---|---|
| DE | 1264191 B1 | 3/1968 |
| DE | 77 31 993 U | 1/1978 |
| DE | 3447008 C2 | 6/1986 |
| DE | 199 24 377 A1 | 12/2000 |
| DE | 102 18 830 C1 | 12/2003 |
| JP | S59-106039 U | 7/1984 |
| JP | 2011168962 A | 9/2011 |
| KR | 2012 0070823 A | 7/2012 |
| WO | 2014106065 A1 | 7/2014 |
| WO | 2014107495 A1 | 7/2014 |

* cited by examiner

VACUUM VALVE WITH ACOUSTIC SENSOR

This application is a 371 National Phase of PCT Application No. PCT/EP2018/067463, filed on Jun. 28, 2018; which claims priority to European Patent application 17179101.5 filed Jun. 30, 2017 and each of which is herein incorporated by reference in its entirety.

The invention relates to a vacuum valve having a sensor arrangement with at least one acoustic sensor.

Vacuum valves for regulating a volume or mass flow and/or for essentially gas-tight closing of a flow path leading through an opening formed in a valve housing are generally known from the prior art in various embodiments and are used in particular in vacuum chamber systems in the area of IC, semiconductor or substrate production, which must take place in a protected atmosphere as far as possible without the presence of contaminating particles. Such vacuum chamber systems comprise in particular at least one evacuatable vacuum chamber which is provided for receiving semiconductor elements or substrates to be processed or produced and which has at least one vacuum chamber opening through which the semiconductor elements or other substrates can be guided into and out of the vacuum chamber, and at least one vacuum pump for evacuating the vacuum chamber. For example, in a production plant for semiconductor wafers or liquid crystal substrates, the highly sensitive semiconductor or liquid crystal elements pass sequentially through several process vacuum chambers in which the parts located within the process vacuum chambers are each processed by means of a processing device. Both during the machining process within the process vacuum chambers and during the transport from chamber to chamber, the highly sensitive semiconductor elements or substrates must always be in a protected atmosphere—especially in an airless environment.

For this purpose, peripheral valves are used to open and close a gas inlet or outlet and transfer valves are used to open and close the transfer openings of the vacuum chambers for inserting and removing the parts.

The vacuum valves through which semiconductor parts pass are referred to as vacuum transfer valves due to the area of application described and the associated dimensioning, as rectangular valves due to their mainly rectangular opening cross-section and also as slide valves, rectangular sliders or transfer slide valves due to their normal mode of operation.

Peripheral valves are used in particular to control or regulate the gas flow between a vacuum chamber and a vacuum pump or another vacuum chamber. For example, peripheral valves are located within a pipe system between a process vacuum chamber or a transfer chamber and a vacuum pump, the atmosphere or another process vacuum chamber. The opening cross-section of such valves, also known as pump valves, is generally smaller than that of a vacuum transfer valve. Peripheral valves are also called regulating valves because, depending on the application, they are not only used to completely open and close an opening but also to control or regulate a flow by continuously adjusting the opening cross-section between a completely open position and a gas-tight closed position. A possible peripheral valve for controlling or regulating the gas flow is the pendulum valve.

In a typical pendulum valve, as known for example from U.S. Pat. No. 6,089,537 (Olmsted), the first step is to rotate a normally round valve disk from a position that releases the opening to an intermediate position that covers the opening via an opening that is usually also round. In the case of a slide valve, as described for example in U.S. Pat. No. 6,416,037 (Geiser) or U.S. Pat. No. 6,056,266 (Blecha), the valve disk, as well as the opening, is usually shaped rectangular and in this first step is pushed linearly from a position releasing the opening into an intermediate position covering the opening. In this intermediate position, the valve disk of the pendulum or slide valve is located at a distance from the valve seat surrounding the opening. In a second step, the distance between the valve disk and the valve seat is reduced so that the valve disk and the valve seat are pressed evenly against each other and the opening is closed essentially gas-tight. This second movement preferably occurs in a direction substantially perpendicular to the valve seat. The sealing can, for example, take place either via a sealing ring arranged on the closing side of the valve disk, which is pressed onto the valve seat surrounding the opening, or via a sealing ring on the valve seat, against which the closing side of the valve disk is pressed. Due to the two-step closing process, the sealing ring between the valve disk and the valve seat is subjected to hardly any shear forces that would destroy the sealing ring, as the movement of the valve disk in the second step takes place essentially in a straight line perpendicular to the valve seat.

Various prior art sealing devices are known, for example from U.S. Pat. No. 6,629,682 B2 (Duelli). A suitable material for sealing rings and seals in vacuum valves is, for example, fluororubber, also known as FKM, in particular the fluoroelastomer known under the trade name "Viton", and perfluororubber, FFKM for short.

From the prior art, different drive systems are known to achieve this combination of a rotational and a translational movement of the valve disk parallel to the opening of the pendulum valve and a substantially translational movement perpendicular to the opening of the slide valve, for example from U.S. Pat. No. 6,089,537 (Olmsted) for a pendulum valve and from U.S. Pat. No. 6,416,037 (Geiser) for a slide valve.

The valve disk must be pressed against the valve seat in such a way that both the required gas tightness within the entire pressure range is ensured and damage to the sealing medium, in particular the sealing ring in the form of an O-ring, caused by excessive pressure loading is avoided. In order to guarantee this, well-known valves provide for pressure regulation of the valve disk which is regulated depending on the pressure difference prevailing between the two valve disk sides. Especially with large pressure fluctuations or the change from vacuum to overpressure, or vice versa, an even force distribution along the entire circumference of the sealing ring cannot always be guaranteed. In general, the aim is to decouple the sealing ring from support forces resulting from the pressure applied to the valve. In U.S. Pat. No. 6,629,682 (Duelli), for example, a vacuum valve with a sealing medium is proposed, which consists of a sealing ring and an adjacent support ring, so that the sealing ring is essentially free of support forces.

In order to achieve the required gas tightness, possibly for both positive and negative pressure, some well-known pendulum valves or slide valves additionally or alternatively to the second movement step provide a valve ring which can be displaced perpendicularly to the valve disk, surrounds the opening and is pressed onto the valve disk to close the valve in a gas-tight manner. Such valves with valve rings that can be actively displaced relative to the valve disk are known, for example, from DE 1 264 191 B1, DE 34 47 008 C2, U.S. Pat. No. 3,145,969 (von Zweck) and DE 77 31 993 U. U.S. Pat. No. 5,577,707 (Brida) describes a pendulum valve with a valve housing having an opening and a valve disk that swivels parallel across the opening to control flow through the opening. A valve ring which surrounds the opening can be actively moved vertically in the direction of the valve disk by means of several springs and compressed air cylinders. A possible further development of this pendulum valve is proposed in US 2005/0067603 A1 (Lucas et al.).

Since the valves mentioned above are used, among other things, in the production of highly sensitive semiconductor elements in a vacuum chamber, a corresponding sealing effect must also be reliably guaranteed for such process chambers. For this purpose, the condition of a sealing material or a sealing surface in contact with the sealing material during compression is of particular importance. During the service life of a vacuum valve, wear of the sealing material or the sealing surfaces can typically occur.

In order to avoid possible leakage or to maintain the quality of the seal at a constant sufficiently high level, a valve closure can typically be replaced at certain intervals. Such a maintenance cycle is usually measured by the number of opening and closing cycles to be expected within a certain period. Maintenance is typically carried out as a precaution in order to be able to exclude the occurrence of a leak as far as possible in advance.

Such a maintenance requirement is not limited to the sealing material or the valve disk alone but extends in particular to other valve components such as the drive unit or the valve seat, which forms a part of the vacuum valve corresponding to the valve disk. The structure of a sealing surface on the side of the valve seat, e.g. a groove embedded in the valve seat, is also affected by mechanical stress. Therefore, a structural change in the groove or valve seat resulting from valve operation may also affect the seal. This, too, is usually done at appropriate maintenance intervals.

A disadvantage of this valve maintenance is its precautionary character. Parts affected by maintenance are usually renewed or replaced before their regular or actual life expires. Each such maintenance step usually means a certain downtime for a production process and an increased technical and financial effort. In sum, this means a standstill in production at intervals that are shorter than necessary and more frequent than would be necessary at all.

In addition, parts of the valve, e.g. the drive unit, are typically not replaced or replaced as part of regular and precautionary maintenance. However, even if such a component were to be replaced regularly, it would still be exposed to external and internal influences in a quasi-new condition, which could lead to undesirable changes in the valve control system, for example. For example, a deviation of an adjustment travel for the valve closure caused by this can lead to a target sealing effect no longer being achieved. Any structural defects, e.g. cracks, can also impair the sealing function.

The invention is thus based on the object of providing an improved vacuum valve, which allows optimized valve maintenance and thus an improvement, i.e. reduction, of any process downtimes.

It is a further object of the invention to provide such a valve system with which a more reliable gas-tight sealing of a process volume can be achieved, in particular wherein the quality of the sealing can be predicted and/or monitored.

These objects are solved by the realization of the characterizing features of the independent claims. Features which further develop the invention in an alternative or advantageous way can be found in the dependent patent claims.

According to the present invention, a vacuum valve and an acoustic sensor are combined and designed in such a way that the combination can be used to monitor and/or detect the condition of the vacuum valve or at least parts of the valve.

The sensor can be used to acquire time-dependent and/or frequency-dependent measurement signals, which in turn can be used to derive status information regarding the vacuum valve.

The acoustic sensor is typically designed to pick up a sound wave, in particular a structure-borne or surface sound wave. Such acoustic sensors are widely known from the prior art. Suitable sound transducers are, for example, sensor types with a sound-sensitive vibrating diaphragm or piezoelectric, electrostatic, electrodynamic or electromagnetic sensors that can be applied to a component to be measured. The sensor can, for example, be glued, welded, soldered or screwed.

In particular, the sensor can be designed as a structure-borne sound microphone or a sound-level or sound-pressure meter.

Alternatively, optical and contactless acoustic sensors can also be used.

This allows a sound propagation in a vacuum valve to be recorded and characterized and consequently the condition of the vacuum valve can be monitored and continuously evaluated on the basis of the recordable data. The data that can be generated in this way can be used to determine a maintenance or replacement time for individual components, such as the grease in the drive or the sealing material.

For example, a failure of the tightness of the valve can be predicted to a large extent and a countermeasure can be recommended or initiated at specific points in time or location. Maintenance intervals can thus be better planned and carried out more efficiently, while at the same time maintaining and safeguarding process integrity.

The relevant status information of the vacuum valve can be, for example, the sound propagation behavior of parts of the drive, of an elastomer sealing material or of a sealing surface.

The invention thus relates to a vacuum valve, in particular a vacuum slide valve, pendulum valve or monovalve, for regulating a volume or mass flow and/or for gas-tight interruption of a flow path. The valve has a valve seat which has a valve opening defining an opening axis and a first sealing surface surrounding the valve opening. In addition, the valve has a valve closure which is designed, for example, as a valve disk for regulating the volume or mass flow and/or for interrupting the flow path, with a second sealing surface corresponding to the first sealing surface.

A drive unit coupled to the valve closure is also designed such that the valve closure can be varied and adjusted in a defined manner in order to provide respective valve opening states and is adjustable from an open position, in which the valve closure at least partially opens the valve opening, to a closed position, in which the second sealing surface is pressed in the direction of the first sealing surface and the valve opening is closed in a substantially gas-tight manner, in particular by means of a seal interposed therebetween, and back again.

The vacuum valve has at least one acoustic sensor, wherein the acoustic sensor is designed and arranged in such a way that, by means of the acoustic sensor, acoustic information can be generated as a measurement signal with respect to a structure-borne sound wave which occurs, is generated or propagates in at least one component (e.g. drive unit, valve closure, valve seat, first and/or second sealing surface) of the vacuum valve.

The information can be acquired in the form of a single sound event or a series of occurring sound phenomena. In particular, a single exceeding of a predefined threshold value can be detected and displayed. Alternatively or additionally, a continuous recording of the structure-borne sound behavior can take place and on this basis an evaluation of the valve condition can take place. In addition, said information may be generated with exclusive reference to a particular valve component or may be of a global nature to provide information on an overall valve condition.

In general, a comparison of a currently recorded acoustic information with a stored target or reference condition can be used to evaluate the valve condition or valve behavior.

The acoustic sensor need not necessarily be located on the component for which the acoustic information is derived. For example, with a known valve design, a type of sound transmission between components can also be known and thus a conclusion can be drawn about a component remote from the sensor. Optical measuring sensors do not have to be arranged on the component to be measured.

The acoustic sensor can be arranged on the drive unit, on the valve closure or on the valve seat in a particular embodiment. It is understood that more than a single sensor can be arranged simultaneously on the valve or its components, thus making measurement signals available and processable for several measurement points. A corresponding sensor arrangement with at least two sensors, which can be placed separately at different locations, is thus also the subject matter of the invention.

According to a certain embodiment, the vacuum valve has a valve housing and the acoustic sensor is located on the valve housing. This enables the formation and propagation of a structure-borne sound wave in the valve body to be detected. By placing the sensor in this way, it is not only possible to record acoustic events that occur on the part of the sensor, but also to detect external acoustic effects, e.g. caused by a component connected to the vacuum valve. In principle, the sensor can be used to monitor the condition of the valve, especially the housing. If, for example, the structure of the housing changes, e.g. if a crack forms in the housing, this also results in a change in the sound propagation behavior or the sound generation behavior at the valve housing. This can be determined with the sensor by comparison with previous measurements or stored target sound characteristics. By providing a corresponding acoustic or visual output information (e.g. alarm signal), a reaction for this event can also be triggered.

In one embodiment, the vacuum valve has a processing and control unit which is designed at least for processing the measurement signal. The processing and control unit can also be used to control the drive unit and thus to control a main valve function.

In accordance with the invention, the processing and control unit can be designed to actuate the drive unit with control values for adjusting the valve closure between the open position and the closed position and to automatically adjust the control values depending on the currently measured signal. For example, when listening to a closing noise, e.g. on the seal of the valve seat, it can be detected that the desired contact pressure has not (yet) been reached. The drive unit can then be actuated or adjusted in such a way that the contact noise corresponds to a target noise which is characteristic for a target contact pressure.

In one embodiment, the processing and control unit can be designed in such a way that the detected measurement signal can be processed by means of the processing and control unit and status information for the at least one component of the vacuum valve can be generated on the basis of the detected measurement signal, in particular wherein an output signal can be provided on the basis of a comparison of the status information with a predefined desired characteristic.

The measurement signal can be analyzed e.g. regarding a maximum amplitude or a recorded frequency range. In addition, a duration for an occurring structure-borne sound event in connection with the frequencies occurring and their characteristics (amplitude) can be taken into account in order to derive the status information. Certain known frequencies may, for example, indicate related negative influences on the function of the valve.

In particular, the status information relating to a mechanical and/or structural integrity of the drive unit, the first or second sealing surface, the seal (sealing material) and/or the valve body can be provided. The status information can be generated by means of an actual-target comparison for the acquired measurement signal.

In one embodiment of the invention, the processing and control unit may be designed to provide a frequency spectrum based on a detection of the measurement signal over a period of time. Here, for example, a measured sound pressure can be plotted over assigned frequencies and an evaluation (automatic or by a user) of a valve or component condition can be carried out on the basis of such a display or evaluation.

In one embodiment, the processing and control unit may be adapted to provide an output signal relating to a localization of a structure-borne sound wave causing the respective measured value frequency based on an analysis of the measurement signal with respect to one or more measurement frequencies. If, for example, the frequency spectrum is known in which the drive unit emits sound when there is a lack of lubricant, the detection of structure-borne sound in this frequency range can be used to draw conclusions about such a lack of lubricant.

For example, localization can also be realized by recognizing characteristic frequencies, e.g., by deducting lower sound frequencies from larger components or from externally induced oscillations and high frequencies from smaller components. By carrying out appropriate tests, in which the individual components are excited acoustically in a targeted manner, such characteristic frequencies can be "learned" and serve as a recognition scheme for the output signals.

In accordance with an embodiment of the invention, the processing and control unit can have a monitoring functionality which is set up in such a way that, during its execution, the measurement signal is detected during a variation of the valve-opening state and a current functional state is derived for at least one component of the vacuum valve, in particular for the drive unit or the first or second sealing surface, based on a comparison of the detected measurement signal and a desired measurement signal relating thereto. Such monitoring can not only allow the current classification of the valve function as "good" or "no longer good", but also enables a trend-related classification of the current valve status between a new status and a necessary maintenance time. This makes it possible to estimate when the next maintenance of the system will be required.

In one embodiment, the processing and control unit can be set up such that a sound propagation behavior can be determined on the basis of the measurement signal and, in particular, can be compared with a previously known nominal sound propagation behavior.

In one embodiment, the processing and control unit may be adapted to provide an output signal based on trend monitoring of the measurement signal of a plurality of processes controlled by the vacuum valve, with the output signal comprising a warning of increased wear of a component of the vacuum valve and/or a prediction of the durability of a component of the vacuum valve.

A warning about increased wear of a component of the vacuum valve could be provided, for example, if trend monitoring would determine that the detected noise levels in the system increase faster from process to process than with a tolerance growth rate. For example, a prediction of the durability of a vacuum valve component could be made by determining or interpolating a trend of amplitude growth from process to process, as determined by trend monitoring, and simulating the continuation of such a trend up to a tolerance limit.

In one embodiment, the acoustic sensor may be arranged and formed such that the measurement signal detects a structure-borne sound wave produced by friction at at least one of the following locations: between at least a part of the seal and at least a part of the first sealing surface, or between at least a part of the seal and at least a part of the second sealing surface.

In particular, the acoustic sensor can be arranged and designed in such a way that the measurement signal detects a structure-borne sound wave generated in the drive unit.

The valve seat of the vacuum valve may be formed by a part of the vacuum valve itself, in particular wherein the valve seat is formed on a housing of the vacuum valve, or provided by a process chamber (chamber wall).

The vacuum valve can also define a vacuum region separated from an external environment, and an acoustic sensor contributing to the measurement signal can be located outside the vacuum region.

Figure 2C:
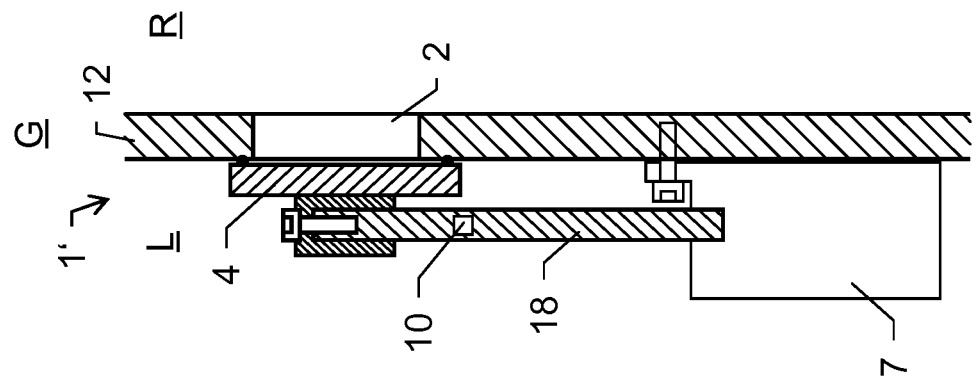
Figure 2B:
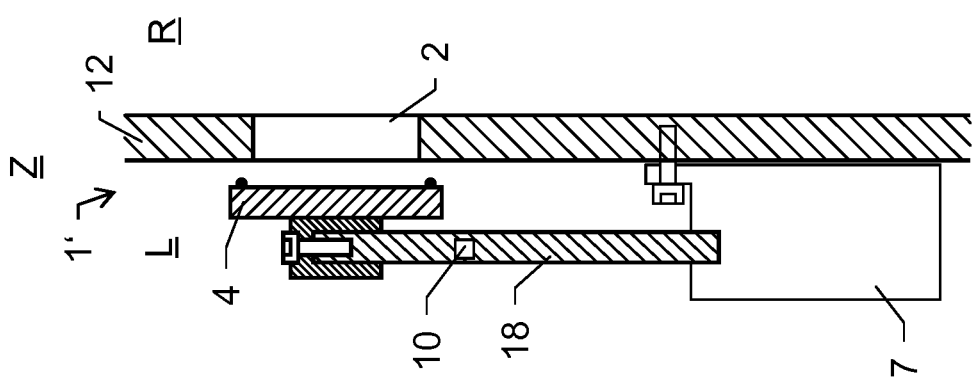
Figure 2A:
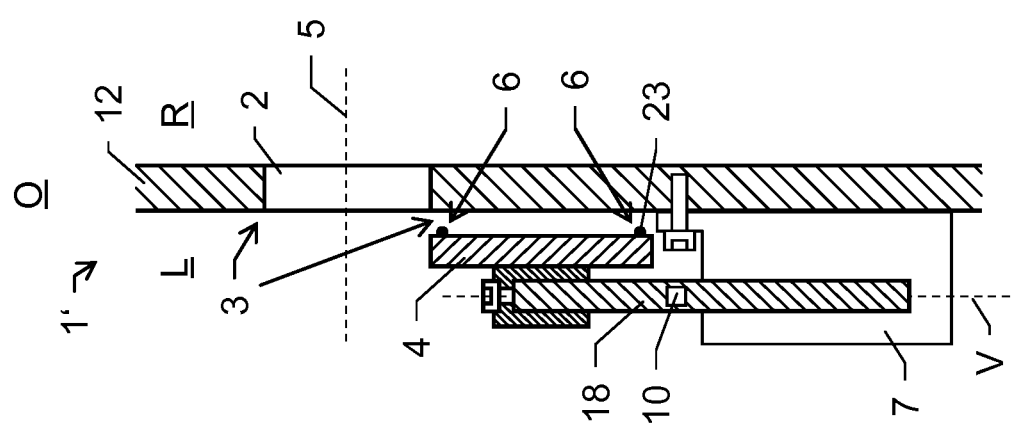
Figure 3A:
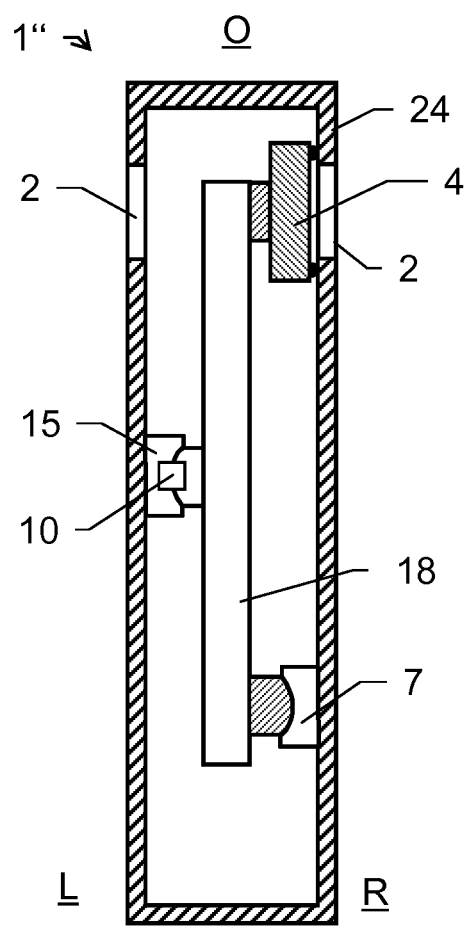
Figure 4A:
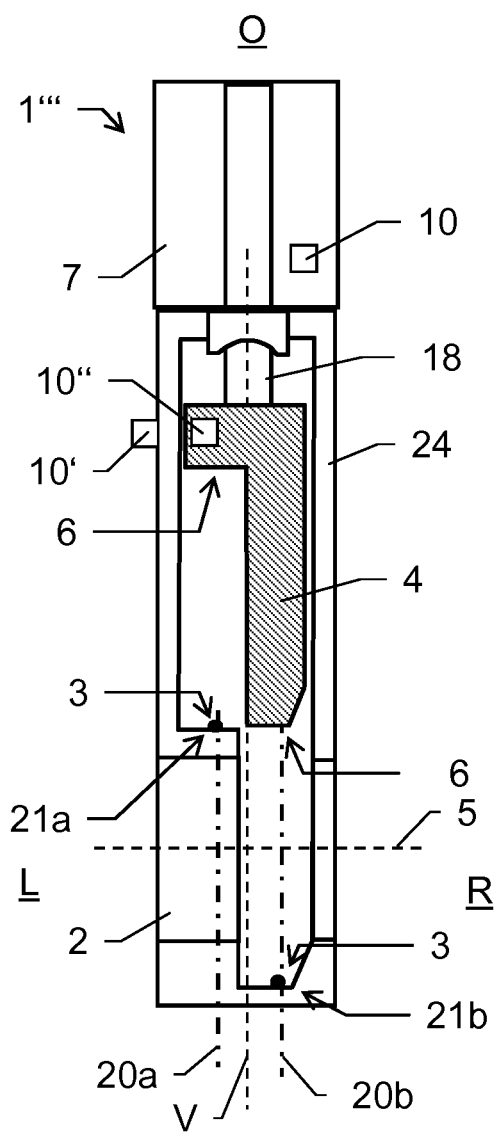

The vacuum valve according to the invention is described in more detail below by means of embodiment examples schematically shown in the drawings. Identical elements are marked in the figures with the same reference signs. As a rule, the embodiments described are not to scale and are not to be understood as limitations, with the drawings showing in detail:

FIGS. 1a,b a possible embodiment of a pendulum valve according to the invention;

FIGS. 2a-c a possible embodiment of a vacuum valve according to the invention as a transfer valve;

FIGS. 3a,b a schematic representation of a sensor arrangement according to the invention in a transfer valve; and a FIGS. 4a,b a schematic representation of another sensor arrangement according to the invention in a monovalve.

Figure 1B:
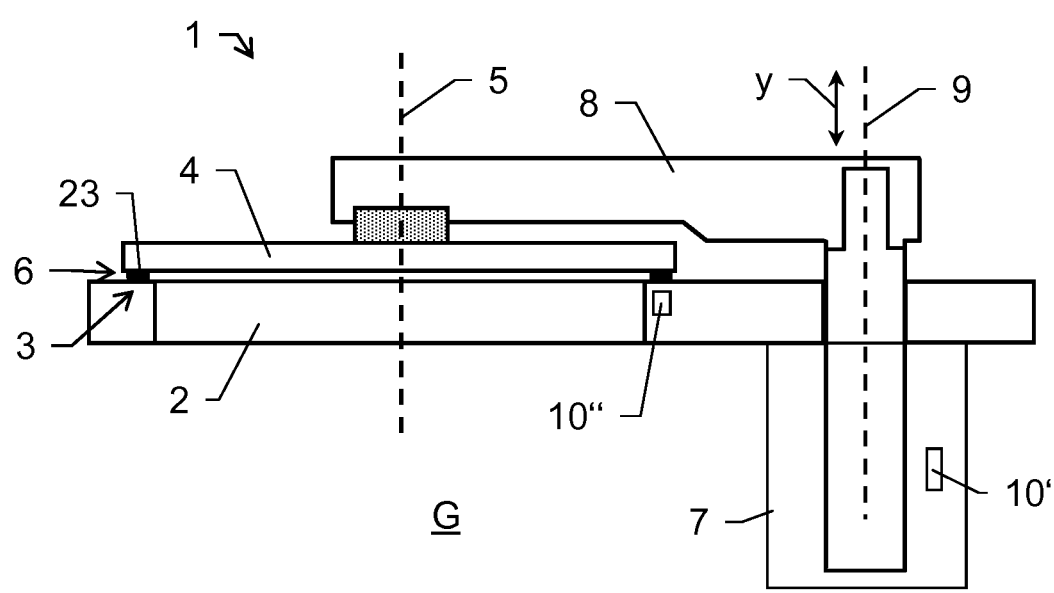

FIG. 1a and FIG. 1b schematically show a possible embodiment of the valve according to the invention in the form of a pendulum valve 1. The valve 1 for regulating a gas flow and for essentially gas-tight interruption of a flow path has a valve housing which has an opening 2. In this case, the opening 2 has a circular cross-section, for example. Opening 2 is enclosed by a valve seat. This valve seat is formed by a sealing surface 3, which has the shape of a circular ring and faces axially in the direction of a valve disk 4 (valve closure), extends transversely to the opening axis 5 and is formed in the valve housing. The valve disk 4 can be pivoted and is essentially adjustable parallel to the opening axis 5. In a closed position G (FIG. 1b) of the valve disk 4 the opening 2 is closed gas-tight by means of the valve disk 4. An open position O of the valve disk 4 is illustrated in FIG. 1a.

The valve disk 4 is connected to a drive 7 (drive unit) via an arm 8 arranged on the side of the disk and extending perpendicular to the opening axis 5. In the closed position G of the valve disk 4, this arm 8 is located outside the geometrically projected opening cross-section of opening 2 along the opening axis 5.

The drive 7 is designed by using an appropriate gear in such a way that the valve disk 4—as is usual with a pendulum valve—can be pivoted by means of a pivoting movement x of the drive 7 transversely to the opening axis 5 and essentially parallel over the cross-section of the opening 2 and perpendicular to the opening axis 5 about a pivoting axis 9 between an open position O and an intermediate position and can be displaced linearly by means of a longitudinal movement y of the drive 7 occurring parallel to the opening axis 5. In the open position O, the valve disk 4 is positioned in a dwell section arranged laterally next to the opening 2, so that the opening 2 and the flow path are released. In an intermediate position, the valve disk 4 is positioned at a distance above opening 2 and covers the opening cross-section of opening 2. In the closed position, opening 2 is closed in a gas-tight manner and the flow path is interrupted by a gas-tight contact between the valve closure 4 (valve disk) and the sealing surface 3 of the valve seat.

In order to enable automated and regulated opening and closing of valve 1, valve 1, for example, provides an electronic processing and control unit which is designed and connected to the drive 7 in such a way that the valve disk 4 can be adjusted accordingly for gas-tight closing of a process volume or for regulating an internal pressure of this volume. For example, the processing and control unit is integrated in the housing of the drive 7 or outsourced via data cable connection or radio connection.

In the present embodiment example, the drive 7 is designed as an electric motor, wherein the gear can be switched in such a way that driving the drive 7 causes either the transverse movement x or the longitudinal movement y. The drive 7 and the gear are electronically actuated by the regulating system. Such gears, in particular with splitter gearshifts, are known from the prior art. Furthermore, it is possible to use several drives to effect the transverse movement x and the longitudinal movement y, wherein the control system assumes actuation of the drives.

The precise regulation or adjustment of the flow rate with the described pendulum valve is not only possible through pivoting adjustment of the valve disk 4 between the open position O and the intermediate position by means of the transverse movement x, but above all by linear adjustment of the valve disk 4 along the opening axis 5 between the intermediate position and the closed position G by means of the longitudinal movement y. The pendulum valve described can be used for precise regulating tasks.

Both the valve disk 4 and the valve seat each have a sealing surface 3 and 6—a first and a second sealing surface. The first sealing surface 3 also has a seal 23. This seal 23 can, for example, be vulcanized onto the valve seat as a polymer by means of vulcanization. Alternatively, the seal 23 can be designed, for example, as an O-ring in a groove of the valve seat. A sealing material can also be bonded to the valve seat and thus embody seal 23. In an alternative embodiment, the seal 23 can be arranged on the side of the valve disk 4, in particular on the second sealing surface 6. Combinations of these embodiments are also conceivable.

The valve disk 4, for example, is variably adjusted on the basis of regulating variables and an output control signal. As an input signal, for example, information about a current pressure state in a process volume connected to the valve is received. In addition, the regulator can be provided with a further input variable, e.g. a mass flow into the volume. On the basis of these variables and on the basis of a preset target pressure which is to be set or reached for the volume, a regulated adjustment of the valve is then carried out over the time of a regulating cycle, so that a mass outflow from the volume can be regulated over time by means of valve 1. For this purpose, a vacuum pump is provided behind valve 1, i.e. the valve is arranged between the process chamber and the pump. Thus a desired pressure curve can be adjusted.

By setting the valve closure 4, a respective opening cross-section is set for valve opening 2 and thus the possible gas quantity that can be evacuated from the process volume per time unit is set. For this purpose, the valve closure 4 may have a shape deviating from a circular shape, especially in order to achieve as laminar a media flow as possible.

To set the opening cross section, the valve disk 4 can be moved by the control unit from the open position O to the intermediate position by means of the transverse movement x of the drive 7 and from the intermediate position to the closed position G by means of the longitudinal movement y of the drive 7. To fully open the flow path, the valve disk 4 can be moved from the closed position to the intermediate position by the longitudinal movement y of drive 7 and from there from the intermediate position to the open position O by the transverse movement x of drive 7.

The valve disk 4 can be pressed against the valve seat in such a way that both the required gas tightness within the entire pressure range is ensured and damage to the seal 23 due to excessive pressure stress is avoided. In order to ensure this, well-known valves provide for contact pressure regulation of valve disk 4 as a function of the pressure difference between the two sides of the valve disk.

Especially in the case of large pressure fluctuations or the change from vacuum to overpressure, or vice versa, an even force distribution during a regulating process, i.e. a variation of the opening cross-section, cannot always be guaranteed. Depending on the valve load, for example, the seal 23 (the sealing material), the valve disk 4 and the sealing surfaces 3 and 6 are subjected to different loads, resulting in variable effective maintenance intervals depending on the valve load.

In the prior art, a valve closure is typically replaced or renewed at fixed intervals as a precautionary measure in order to avoid possible leakage or to maintain the quality of the seal at a sufficiently high level. One disadvantage of this is that valve parts are usually renewed or replaced before their regular or actual service life expires.

According to the present invention, the vacuum valve 1 has a first acoustic sensor 10 which is arranged on the valve housing.

With such a sound emission sensor 10, sound waves can be measured which propagate in a metallic component such as the valve housing. If sound waves are introduced into or generated in this component, as is the case, for example, when an object hits or rubs against the part fitted with the sensor 10, then these can be measured by the sensor. If a microcrack occurs within the component, the wave propagation changes as a result, which in turn can be determined by a measurement carried out by the sensor 10.

A measuring point on the vacuum housing allows sound emissions to be measured which are released when valve 1 closes when the second sealing surface 6 hits the first sealing surface 3 or seal 23. The sound pulse generated can be characteristic for the sealing arrangement used.

The resulting sound pulse can therefore be recorded and compared with a known reference sound pulse (e.g. from a previous recording). This comparison can be used to detect a deviation from a target state. For example, if a changed sound amplitude or an acoustic event occurs in a different frequency range, a corresponding conclusion can be drawn about the condition of the seal.

The currently detected sound impulse and its deviation from the reference can provide information about a degree of wear of the sealing material 23. Such a deviation may typically be more pronounced with an increase in the service life of valve 1. This allows the seal condition to be continuously monitored and a time for a necessary replacement of seal 23 can be predicted. In other words, it enables monitoring of seal wear. In contrast to the prior art, the seal can therefore be serviced as required and independent of its service life without impairing the valve function.

Furthermore, a corresponding analysis of the sensor signal makes it possible to determine the current functional accuracy. The structure-borne noise occurring can be used to determine if the sealing material 23 (e.g. an elastomer) moves (rubs) relative to at least one of the sealing surfaces 3, 6 during a closing or opening process. Such transverse stress could detach unwanted particles from the seal 23 or a sealing surface and, for example, contaminate a process volume. The early detection of such a malfunction enables a correspondingly prompt reaction and can thus prevent a loss of production.

It is also conceivable that corresponding "reference noises" are stored for different sealing materials used. On the one hand, this makes it possible to identify the sealing material used simply by means of an acoustic analysis, e.g. of a closing noise. On the other hand, by replacing the seal, the newly used sealing material can be selected and this information can be used for further acoustic process monitoring.

The vacuum valve 1 has two further acoustic sensors 10' and 10". The sensor 10' is provided on the drive 7 and thus enables the direct acquisition and analysis of (structure-borne) sound waves and impulses which can be caused by actuating the drive 7. Reference frequency spectra can also be available for such adjustment movements of the drive 7 and a current signal can be compared with them. This enables monitoring of the drive unit 7 with regard to its correct functionality. A significant deviation of a recorded structure-borne sound spectrum from a reference spectrum, e.g. to a certain extent beyond a tolerance range, can be an indicator for a faulty activity of the drive 7.

The acoustic sensor 10" is placed close to the valve seat or the first sealing surface 3 and thus allows a direct detection of a sound emission with direct reference to a closing or opening of the valve 1. This sensor 10" can be used e.g. exclusively for the determination of a current state or a change of state of the seal 23 (of the sealing material).

An evaluation of seal wear may be based on empirical values or said reference records, for which the valve component in question is specifically excited to emit sound in a target state.

In addition or alternatively, an acoustic sensor could also be provided on each of the other components shown, wherein an evaluation of the measured values must be adapted accordingly.

As an alternative to a pendulum valve as shown, the sensor solution according to the invention can be realized with another vacuum valve type, e.g. a flap valve, slide valve or a so-called butterfly control valve. In particular, the valve according to the invention is designed for use in the vacuum region. In addition, pendulum valves can also be used, the closure of which can only be adjusted in one direction.

FIG. 2a to FIG. 2c schematically show a possible embodiment of the valve 1' according to the invention in the form of a transfer valve 1', shown in different closing positions. The reference numerals used in the previous figures apply analogously here.

The shown transfer valve 1' is a special form of a slide valve. The vacuum valve has a rectangular, plate-shaped closing element 4 (e.g. valve disk), which has a sealing surface 6 for gas-tight closing of an opening 2. The opening 2 has a cross-section corresponding to the closure element 4 and is formed in a wall 12. Opening 2 is surrounded by a valve seat, which in turn also provides a sealing surface 3 corresponding to the sealing surface 6 of the closure element 4. The sealing surface 6 of the closure element 4 extends around the closure element 4 and carries a sealing material 23 (seal). In a closed position the sealing surfaces 3 and 6 are pressed together and the sealing material 23 is pressed between the two sealing surfaces 3 and 6.

The opening 2 connects a first gas area L, which is located in the figure to the left of wall 12, with a second gas area R to the right of wall 12. Wall 12 is formed, for example, by a chamber wall of a vacuum chamber. The vacuum valve is then formed by interaction of the chamber wall 12 with the closure element 4.

The closure element 4 is arranged on an adjustment arm 18, which here is rod-shaped, for example, and extends along a geometric adjustment axis V. The adjustment arm 18 is mechanically coupled to a drive unit 7, by means of which the closure element 4 can be adjusted in the first gas area L left of the wall 12 by adjusting the adjustment arm 18 between an open position O (FIG. 2a) via an intermediate position Z (FIG. 2b) into a closed position G (FIG. 2c) by means of the drive unit 7.

In the open position O, the closure element 4 is located outside the projection area of opening 2 and releases it completely, as shown in FIG. 2a.

By adjusting the adjustment arm 18 in axial direction parallel to the adjustment axis V and parallel to the wall 12, the closure element 4 can be adjusted from the open position O to the intermediate position Z by means of the drive unit 7.

In this intermediate position Z, the closure element 4 covers opening 2 and is located at a distance from the valve seat. The sealing surfaces 3 and 6 are also in the corresponding opposite position.

By adjusting the adjustment arm 18 in the direction transverse to the adjustment axis V, e.g. perpendicular to the wall 12 and to the valve seat and thus in the direction of axis 5, the closing element 4 can be adjusted from the intermediate position Z to the closed position G (FIG. 2c).

In the closed position G the closure element 4 closes the opening 2 gas-tight and separates the first gas area L from the second gas area R gas-tight.

The vacuum valve is thus opened and closed by means of the drive unit 7 through an L-shaped movement of the closing element 4 and the adjustment arm 18. The transfer valve shown is therefore also called an L-type valve.

A transfer valve as shown is typically used to seal a process volume (vacuum chamber) and to load and unload the volume. Frequent changes between the open position O and the closed position G are the rule with such an application. This can lead to increased wear of the sealing surfaces 3 and 6, the seal 23 and the drive 7.

The valve 1' has an acoustic sensor 10 according to the invention. The sensor 10 is arranged on or in the valve stem 18 and thus enables the detection of structure-borne noise which occurs, for example, when the stem 18 is moved by the drive unit 7. A measurement signal representing the type (frequency) and intensity (amplitude) of structure-borne sound is continuously provided by the sensor 10. A registration of the signal over a certain period of time also allows a change in the structure-borne sound to be recorded. The detected measurement signal can therefore be recorded in an especially time-dependent manner and subsequently be evaluated.

The sensor arrangement according to the invention with the valve stem 18 allows the failure of various components to be predicted during valve operation by issuing a warning of irregular sound phenomena, i.e. in particular such sound phenomena deviating from a tolerance or of unwanted trends in a change in structure-borne sound behavior.

Figure 3B:
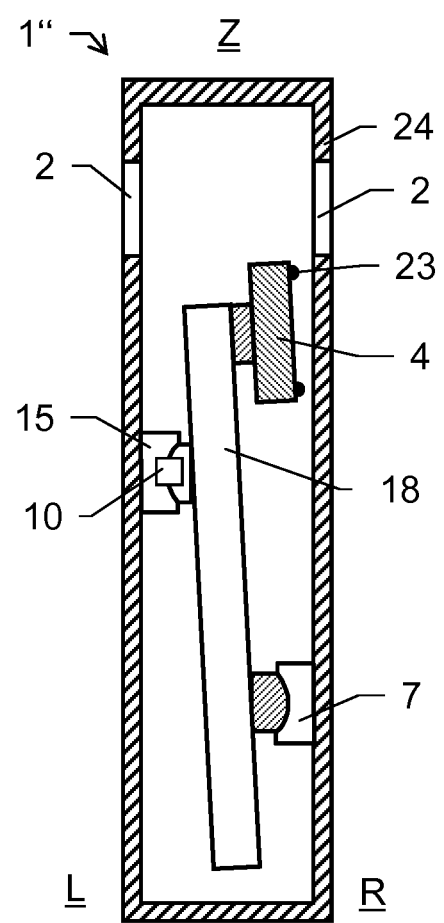

FIGS. 3a and 3b schematically show another possible sensor arrangement in a transfer valve 1" according to the invention, shown in a closed position G (FIG. 3a) and an open position O (FIG. 3b).

The reference numerals used in the previous figures apply analogously here. In the figures shown, the valve seat is formed on a housing 24 of the vacuum valve 1". For a person skilled in the art, however, it is clear that the following description can essentially be applied analogously to embodiments, wherein the valve seat is provided by a process chamber, i.e. a chamber housing.

Furthermore, it is understood that the valve mechanism shown here schematically as a tilting mechanism is not to be understood as restrictive and that a person skilled in the art can transfer the sensor arrangement according to the invention, for example, in an analogous way to any L-Motion drive, e.g. an L-Motion drive with two linear adjustment directions of the valve disk disposed perpendicular to each other.

For the controlled guidance of the adjustment arm 18, for example, the vacuum valve here has a guide component 15, wherein the drive unit 7 and the guide component 15 are each in a fixed arrangement to each other, here, for example, because both the drive unit 7 and the guide component 15 are each fixedly connected to the valve housing 24. The adjustment arm 18 is further mechanically coupled to the valve closure 4 and the drive unit 7, wherein by adjusting the adjustment arm 18, by means of the drive unit 7, the valve closure 4 is adjustable between the open position O and the closed position G substantially parallel to the valve seat, in particular in an L-motion movement as described in FIGS. 2a to 2d.

According to the invention and as an example, the sensor arrangement comprises the acoustic sensor 10, which is provided on the guide component 15 and can be designed in such a way that the measurement signal detects a stick-slip effect on one of the coupling components and/or in the drive 7 and makes it recognizable. Friction oscillations on the seal 23 can also be detected with such a sensor arrangement, wherein an arrangement of the sensor 10 closer to the seal is also conceivable, e.g. on the valve housing 24 near the valve seat.

The acoustic sensor 10 enables a direct detection of a structure-borne sound wave in a moving part of the valve 1". This makes it possible to derive status information for the vacuum valve 1", based, for example, on a target-actual comparison for the recorded measurement signal with regard to a known and usual sound generation (vibration) emanating from the drive unit 7. If the recorded sound values reach a value range that was previously classified as critical, a warning signal can be provided.

Figure 4B:
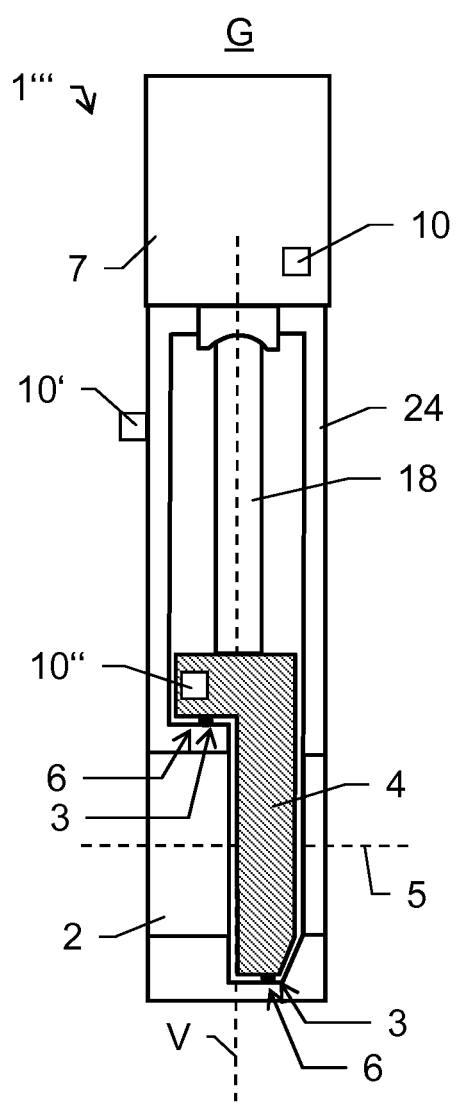

FIGS. 4a and 4b show further arrangements of acoustic sensors 10-10", here for example in a so-called monovalve 1''', shown in a closed position G (FIG. 4b) and an open position O (FIG. 4a).

The valve 1''' for the gas-tight closing of a flow path by means of a linear movement has a valve housing 24 with an opening 2 for the flow path, wherein the opening 2 has a geometric opening axis 5 along the flow path. The closure element 4 can be displaced linearly along a geometrical adjustment axis V running transversely to the opening axis 5 in a closure element plane from an open position O releasing the opening 2 into a closed position G linearly pushed over the opening 2 in a closing direction and vice versa back into an opening direction.

For example, a curved first sealing surface 3 encloses the opening 2 of the valve body 24 along a first section 21a in a first plane 20a and along a second section 21b in a second plane 20b. The first plane 20a and the second plane 20b are spaced apart from each other, extend parallel to each other and parallel to the closure element plane. Thus the first section 21a and the opposite second section 21b have a geometric offset to each other transverse to the adjustment axis V and in the direction of the opening axis 5. The opening 2 is arranged between the two opposing sections 21a and 21b in the area extending along the adjustment axis V.

The closure element 4 has a second sealing surface 6 corresponding to the first sealing surface 3, which extends along sections 21a, 21b corresponding to the first and second sections.

Monovalves 1''', i.e. vacuum valves which can be closed by a single linear movement, have the advantage of a relatively simple closing mechanism, for example, compared with transfer valves which can be closed by two movements and which require a relatively complex drive system. Since the closure element 4 can also be made in one piece, it can be subjected to high acceleration forces, so that this valve can also be used for quick and emergency closures. Closing and sealing can be carried out by a single linear movement, allowing the valve to be closed and opened very quickly.

One particular advantage of monovalves, for example, is that the seal is not subject to any transverse load in the transverse direction to the longitudinal extension of the seal due to its course when it closes. On the other hand, due to its transverse extension to the opening axis 5, the seal is hardly able to absorb the forces occurring on the closure element 4 along the opening axis 5, which can act on the closure element 4 in particular at high differential pressure, which may require a robust construction of the closure element 4, its drive and its bearing.

The sensors 10-10'' are arranged on the drive unit 7, the valve housing 24 and the valve closure 4. This means that specific measurement signals can be recorded with reference to the respective valve components. By evaluating the individual signals, information can be generated for the respective states of the individual components.

By calculating the signals or looking at individual signal evaluations together, information can be derived that goes beyond this, such as a direct effect of a sound event occurring at the drive unit on the valve closure 4. This can be used to record how the sound propagates in a valve.

To evaluate the measurement signals, the time-dependent measurements can be converted into a frequency-dependent signal (frequency spectrum).

Due to the sound phenomena that occur, it is possible to deduce the state of the drive 7, for example. For example, a frequency spectrum can be used to assess whether lubricating grease still has a sufficient consistency or whether it is already showing signs of ageing.

It can also be detected in the system (e.g. over several processes) whether the frequency spectrum changes, e.g. due to wear, in particular abrasion in the drive unit, and/or when an unacceptable wear is likely to occur on the basis of a determined trend.

By comparison with known reference spectra, it is also possible to determine transport damage, earthquakes or crashes with the valve or nearby components in the process, particularly wherein measures can be taken, e.g. in the form of an emergency stop or slow-down of the process.

It is understood that the illustrated figures only schematically represent possible embodiment examples. The different approaches can also be combined with each other and with prior-art processes and devices.

The invention claimed is:

1. A vacuum valve comprising:
 a vacuum slide valve, pendulum valve or monovalve, for regulating a volume or mass flow and/or for gas-tight interruption of a flow path, having
  a valve seat which has a valve opening defining an opening axis and a first sealing surface surrounding the valve opening,
  a valve closure for regulating the volume or mass flow and/or for interrupting the flow path, having a second sealing surface corresponding to the first sealing surface, and
  a drive unit which is coupled to the valve closure, the valve closure providing respective valve opening states that are variable and adjustable in a defined manner, the valve closure being adjustable from an open position (O), in which the valve closure at least partially opens the valve opening, to a closed position (G), in which the second sealing surface is pressed in the direction of the first sealing surface and the valve opening is closed in a substantially gas-tight manner, and is adjustable back again,
 wherein the vacuum valve has at least one acoustic sensor,
 wherein the acoustic sensor generates information about a structure-borne sound wave occurring in at least one component of the vacuum valve as a measurement signal,
 wherein the vacuum valve has a processing and control unit that processes the measurement signal, and
 wherein the processing and control unit is adapted to actuate the drive unit with control values for adjusting the valve closure between the open position (O) and the closed position (G), and to automatically set the control values depending on the currently acquired measurement signal.

2. The vacuum valve according to claim 1, wherein the acoustic sensor is arranged on the drive unit.

3. The vacuum valve according to claim 1, wherein the acoustic sensor is arranged on the valve closure or the valve seat.

4. The vacuum valve according to claim 1, wherein the vacuum valve has a valve housing and the acoustic sensor is arranged on the valve housing.

5. The vacuum valve according to claim 1, wherein the processing and control unit processes the detected measurement signal and, based on the detected measurement signal, generates a status information for the at least one component of the vacuum valve, wherein an output signal is provided based on an alignment of the status information with a predefined target feature.

6. The vacuum valve according to claim 5, wherein the status information relating to a mechanical and/or structural integrity of the drive unit, the first or second sealing surface, the seal and/or the valve housing is provided, wherein the status information is generated by an actual-target comparison for the detected measurement signal.

7. The vacuum valve according to claim 1, wherein the processing and control unit is adapted to provide a frequency spectrum based on a detection of the measurement signal during a predetermined period of time.

8. The vacuum valve according to claim 1, wherein the processing and control unit has a monitoring functionality which is adapted in such a way that, when it is carried out, the measurement signal is detected during variation of the valve opening state, and a current functional state is derived for at least one component of the vacuum valve, based on a comparison of the detected measurement signal and a corresponding target measurement signal.

9. The vacuum valve according to claim 1, wherein the processing and control unit determines a sound propagation behavior on the basis of the measurement signal and compares the sound propagation behavior with a previously known target sound propagation behavior.

10. The vacuum valve according to claim 1, wherein the acoustic sensor detects, via the measurement signal, a structure-borne sound wave, which sound wave is produced by friction at least one of the following locations:
   between at least a part of the seal and at least a part of the first sealing surface, and
   between at least a part of the seal and at least a part of the second sealing surface.

11. The vacuum valve according to claim 1, wherein the acoustic sensor detects, via the measurement signal, a structure-borne sound wave which is produced in the drive unit.

12. A vacuum valve comprising:
   a vacuum slide valve, pendulum valve or monovalve, for regulating a volume or mass flow and/or for gas-tight interruption of a flow path, having
      a valve seat which has a valve opening defining an opening axis and a first sealing surface surrounding the valve opening,
      a valve closure for regulating the volume or mass flow and/or for interrupting the flow path, having a second sealing surface corresponding to the first sealing surface, and
      a drive unit which is coupled to the valve closure, the valve closure providing respective valve opening states that are variable and adjustable in a defined manner, the valve closure being adjustable from an open position (O), in which the valve closure at least partially opens the valve opening, to a closed position (G), in which the second sealing surface is pressed in the direction of the first sealing surface and the valve opening is closed in a substantially gas-tight manner, and is adjustable back again,
   wherein the vacuum valve has at least one acoustic sensor,
   wherein the acoustic sensor generates information about a structure-borne sound wave occurring in at least one component of the vacuum valve as a measurement signal,
   wherein the vacuum valve has a processing and control unit that processes the measurement signal, and
   wherein the processing and control unit is adapted to provide, based on an analysis of the measurement signal with respect to one or more measurement frequencies, an output signal with respect to a localization of a structure-borne sound wave causing the respective measurement frequency.

13. A vacuum valve comprising:
   a vacuum slide valve, pendulum valve or monovalve, for regulating a volume or mass flow and/or for gas-tight interruption of a flow path, having
      a valve seat which has a valve opening defining an opening axis and a first sealing surface surrounding the valve opening,
      a valve closure for regulating the volume or mass flow and/or for interrupting the flow path, having a second sealing surface corresponding to the first sealing surface, and
      a drive unit which is coupled to the valve closure, the valve closure providing respective valve opening states that are variable and adjustable in a defined manner, the valve closure being adjustable from an open position (O), in which the valve closure at least partially opens the valve opening, to a closed position (G), in which the second sealing surface is pressed in the direction of the first sealing surface and the valve opening is closed in a substantially gas-tight manner, and is adjustable back again,
   wherein the vacuum valve has at least one acoustic sensor,
   wherein the acoustic sensor generates information about a structure-borne sound wave occurring in at least one component of the vacuum valve as a measurement signal,
   wherein the vacuum valve has a processing and control unit that processes the measurement signal, and
   wherein the processing and control unit is adapted to provide, on the basis of trend monitoring of the measurement signal of a plurality of processes controlled by the vacuum valve, an output signal which includes one or both of:
   a warning about increased wear of a component of the vacuum valve, and
   a prediction of the durability of a component of the vacuum valve.

* * * * *